United States Patent
Song et al.

(10) Patent No.: US 11,189,410 B2
(45) Date of Patent: Nov. 30, 2021

(54) SUPERCONDUCTING MAGNET FOR EDDY-CURRENT BRAKING FOR HIGH-SPEED TRAINS

(71) Applicant: HEFEI INSTITUTES OF PHYSICAL SCIENCE, CHINESE ACADEMY OF SCIENCES, Anhui (CN)

(72) Inventors: Yuntao Song, Anhui (CN); Chao Fang, Anhui (CN); Jing Wei, Anhui (CN); Wenhua Dai, Anhui (CN); Shuangsong Du, Anhui (CN); Jinxing Zheng, Anhui (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 17/030,314

(22) Filed: Sep. 23, 2020

(65) Prior Publication Data

US 2021/0005367 A1  Jan. 7, 2021

Related U.S. Application Data

(63) Continuation of application No. PCT/CN2019/097318, filed on Jul. 23, 2019.

(51) Int. Cl.
*H01F 6/04* (2006.01)
*H01F 6/06* (2006.01)
(Continued)

(52) U.S. Cl.
CPC .................. *H01F 6/04* (2013.01); *B60L 7/28* (2013.01); *B61H 11/00* (2013.01); *H01F 6/06* (2013.01); *B60L 2200/26* (2013.01)

(58) Field of Classification Search
CPC ........ H01F 6/04; H01F 6/06; H01F 2027/406; H01F 6/00; B60L 7/28; B60L 2200/26;
(Continued)

(56) References Cited

U.S. PATENT DOCUMENTS

| 3,615,881 | A | * | 10/1971 | Greene | .................. C23C 14/58 |
| | | | | | 148/97 |
| 3,801,942 | A | * | 4/1974 | Elsel | .................. H01F 6/06 |
| | | | | | 335/216 |
| 5,739,689 | A | * | 4/1998 | Roth | .................. F17C 3/085 |
| | | | | | 324/319 |

FOREIGN PATENT DOCUMENTS

| CN | 101468609 A | 7/2009 |
| CN | 203118700 U | 8/2013 |

(Continued)

OTHER PUBLICATIONS ip.com Search Results U.S. Appl. No. 17/030,314.*
Global Dossier for U.S. Appl. No. 17/030,314.*

*Primary Examiner* — Mohamad A Musleh

(57) ABSTRACT

A superconducting magnet for eddy-current braking for a high-speed train. The superconducting magnet is fixed at a bottom of a bogie of the high-speed train through a connecting mechanism, and an air gap is formed between the superconducting magnet and a top of a guide rail below the bogie. The superconducting magnet after being excited generates an eddy-current effect with the guide rail of the high-speed train, so as to generate a braking force opposite to a traveling direction of the train, thereby braking the high-speed train. A liquid-level meter is provided on the superconducting magnet to detect a position of a cooling agent liquid level in real time. The superconducting magnet withstands vibration impact through elastic tie rod assemblies when the high-speed train is under operation, showing good adaptability.

11 Claims, 2 Drawing Sheets

(51) Int. Cl.
 *B60L 7/28* (2006.01)
 *B61H 11/00* (2006.01)
(58) Field of Classification Search
 CPC ..... B61H 11/00; B61H 7/083; F16D 2121/20; F16D 63/008; B60T 13/748
 See application file for complete search history.

(56) References Cited

FOREIGN PATENT DOCUMENTS

| | | | |
|---|---|---|---|
| CN | 103552473 | A | 2/2014 |
| CN | 104377998 | A | 2/2015 |
| CN | 109102985 | A | 12/2018 |
| JP | 2018017151 | A | 2/2018 |
| KR | 101171638 | B1 | 8/2012 |

* cited by examiner

SUPERCONDUCTING MAGNET FOR EDDY-CURRENT BRAKING FOR HIGH-SPEED TRAINS

CROSS-REFERENCE TO RELATED APPLICATIONS

This application is a continuation of International Patent Application No. PCT/CN2019/097318, filed on Jul. 23, 2019, which claims the benefit of priority from Chinese Patent Application No. 201810810989.0, filed on Jul. 23, 2018. The content of the aforementioned applications, including any intervening amendments thereto, is incorporated herein by reference.

TECHNICAL FIELD

The present application relates to the braking for high-speed trains, and more particularly to a superconducting magnet for eddy-current braking for high-speed trains.

BACKGROUND

Generally, the adhesion braking, such as braking using brake pads and discs and electric braking is adopted in high-speed trains. However, the wheel-rail adhesion performance (i.e., wheel-rail friction coefficient) affects the active braking of the trains, and the brake discs and brake pads etc. for braking are severely worn due to large mechanical frictions. For a train and its operating lines, the wheel-rail friction coefficient is mainly affected by the rail surface conditions and the train speed. For example, harsh natural conditions such as rain, snow, ice, frost and fallen leaves will greatly reduce the wheel-rail friction coefficient. Further, the wheel-rail friction coefficient drops as the train speed increases, and practical operations show that when the train speed is more than 300 km/h, the wheel-rail friction coefficient decreases sharply, causing the sliding of the train. In long slopes, the braking only through the adhesion braking greatly reduces the life service of train components.

Eddy-current braking is independent of wheel-rail adhesion. The combination of the eddy-current braking and the existing wheel-rail adhesion braking can greatly increase braking forces of the trains, which is an optimal solution to improve the braking of the trains at a higher speed. The eddy-current braking of the high-speed trains includes permanent magnetic eddy-current braking and electromagnetic eddy-current braking according to different excitation modes. The permanent magnetic eddy-current braking does not require external power supply and has low weight, small thermal load and low operating cost. However, the permanent magnetic eddy-current braking fails to adjust braking force and is magnetic even in a non-operational state. The electromagnetic eddy-current braking currently uses conventional magnets, in which iron core are wound by windings. The electromagnetic eddy-current braking has relatively larger braking force, and the braking force can be adjusted by changing excitation current. Therefore, the electromagnetic eddy-current braking is a highly promising technique for the high-speed trains. However, electromagnetic eddy-current brakes have large electric power consumption and high coil temperature, and the braking force is limited by weight and volume thereof. A superconducting eddy-current brake using a superconducting magnet technique not only has advantages of the conventional electromagnet eddy-current braking, but also has reduced weight and size, increased magnetic flux density and reduced energy loss. However, when the trains are under high-speed operation, the braking brings inertial impacts on the superconducting magnet, so the magnet requires a special structure to address such impacts. Therefore, it is significant to develop a superconducting magnet for the eddy-current braking for high-speed trains that not only surpasses the conventional electromagnet eddy-current brake in energy consumption, size and weight, but also adapts to a special working environment under which the high-speed trains run.

SUMMARY

This application provides a superconducting magnet for eddy-current braking for a high-speed train, which not only meets the requirements of the light weight and less energy consumption for the high-speed train, but also adapts to a special working environment under which the high-speed train runs.

To achieve the above objects, the application uses the following technical solution.

A superconducting magnet for eddy-current braking for a high-speed train, comprising a container for the superconducting magnet; wherein the container comprises a coil box, a thermal shield and a Dewar which are nested in sequence from inside to outside; the coil box is filled with liquid helium, and a liquid helium inlet and a liquid helium outlet are provided on the coil box; a superconducting coil is provided in the coil box, and is immersed in the liquid helium; a coil terminal inlet and a coil terminal outlet are provided on the coil box; the thermal shield has a high vacuum environment therein; a plurality of liquid nitrogen pipelines surround an outer wall of the thermal shield; and the thermal shield is provided with a liquid nitrogen inlet and a liquid nitrogen outlet.

In some embodiments, each of two sides of the container is provided with an inner tube which is integrally formed with the thermal shield and an outer tube which is integrally formed with the Dewar; the outer tube is sheathed on the inner tube; each of the two sides of the container is provided with a horizontal tie rod assembly; the horizontal tie rod assembly comprises an inner horizontal heat insulating block, a horizontal spring, an outer horizontal heat insulating block and a horizontal force transmission rod; the inner horizontal heat insulating block is fixed on each of two side walls of the coil box; the horizontal force transmission rod is fixedly sheathed in the inner tube; an outer end of the horizontal force transmission rod extends out of the inner tube and is fixed at an end of the outer tube; an inner end of the horizontal force transmission rod is fixedly connected to the outer horizontal heat insulating block; and the horizontal spring is provided between the inner horizontal heat insulating block and the outer horizontal heat insulating block.

In some embodiments, a vertical tie rod assembly is provided at an upper portion of the container; the vertical tie rod assembly comprises an inner vertical heat insulating block, a vertical spring, an outer vertical heat insulating block and a vertical force transmission rod; a recess is provided at a top of the coil box; the inner vertical heat insulating block is fixed at a bottom of the recess; the vertical force transmission rod is longitudinally fixedly inserted in a top of the thermal shield; a top end of the vertical force transmission rod is fixed on the Dewar, and a bottom end of the vertical force transmission rod is fixedly connected to the outer vertical heat insulating block; and the vertical spring is provided between the inner vertical heat insulating block and the outer vertical heat insulating block.

In some embodiments, the superconducting coil is fixed inside the coil box through a limit block.

In some embodiments, a liquid-level meter and a temperature sensor are provided in the coil box.

In some embodiments, the container is fixed to a bottom of a bogie of the high-speed train through a support structure, and an air gap is formed between the container and a top surface of a guide rail below the bogie.

In some embodiments, a liquid level of the liquid helium is at least 1.5 times the height of the superconducting coil.

In some embodiments, the superconducting coil is oval-shaped.

In some embodiments, four vertical tie rod assemblies are arranged at the upper portion of the container.

The superconducting magnet of the application is fixed at the bottom of the bogie of the high-speed train through the support structure, and the air gap is formed between the superconducting magnet and the top surface of the guide rail below the bogie. The superconducting magnet is excited through a power supply only under braking. The superconducting magnet is always immersed in the liquid helium under non-braking. The superconducting magnet is provided with the liquid-level meter to detect a position of the liquid level of cooling agents in real time. The superconducting magnet can withstand the vibration impact through elastic horizontal and vertical tie rod assemblies when the train is under high-speed operation. The horizontal and vertical tie rod assemblies of the superconducting magnet are provided with heat insulating blocks to effectively reduce the cooling agent loss caused by heat conduction.

In some embodiments, the magnet is an immersion-cooled superconducting magnet. The liquid level of the cooling agents is at least 1.5 times the height of the superconducting coil.

In some embodiments, the superconducting magnet is tightly connected to a longitudinal beam of the bogie at a corresponding side.

In some embodiment, the horizontal and vertical tie rod assemblies of the superconducting magnet are provided with the horizontal and vertical springs to withstand the vibration impact of the train on the superconducting magnets, and also provided with the heat insulating blocks to reduce the cooling agent loss.

This application has the following advantages.

1) Comparing to the conventional electromagnet for the eddy-current braking for the high-speed train, the superconducting magnet reduces energy consumption during operation and increases the magnetic flux density and the braking force under the same volume and weight.

2) The superconducting magnet has a specially designed structure to withstand the inertial impact caused by the vibration and the braking when the train is at a high speed.

Figure 1:
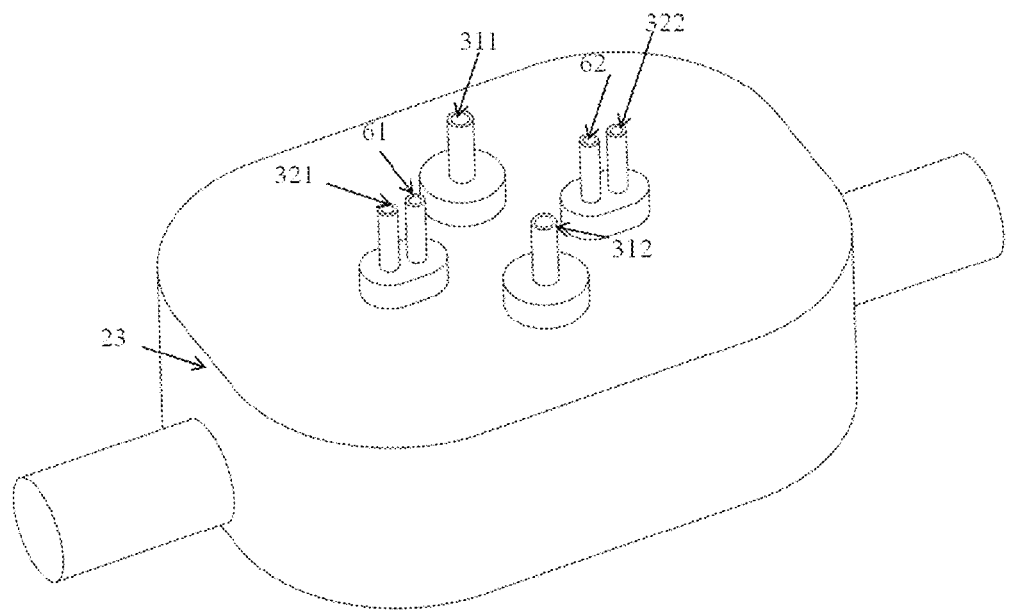
FIG. 1 schematically shows an exterior of a superconducting magnet for eddy-current braking for the high-speed train according to the present application.
Figure 2:
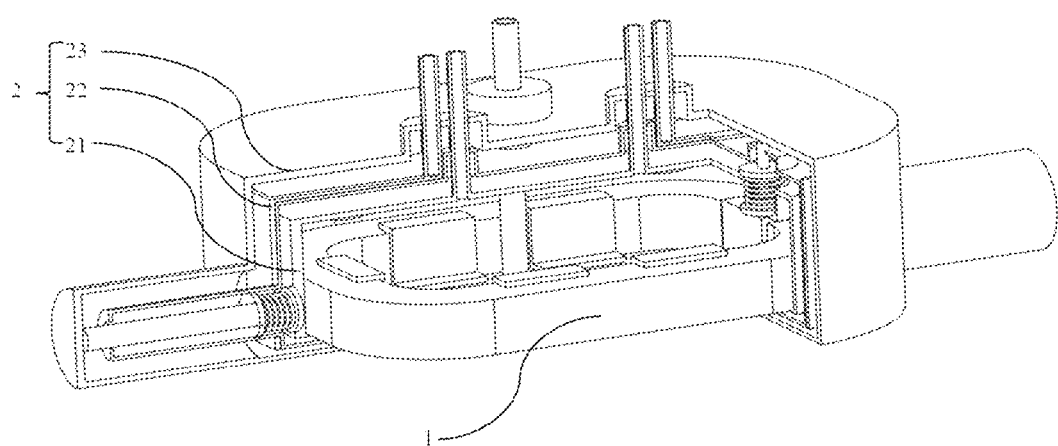
FIG. 2 schematically shows an interior of the superconducting magnet for the eddy-current braking for the high-speed train according to the present application.
Figure 3:
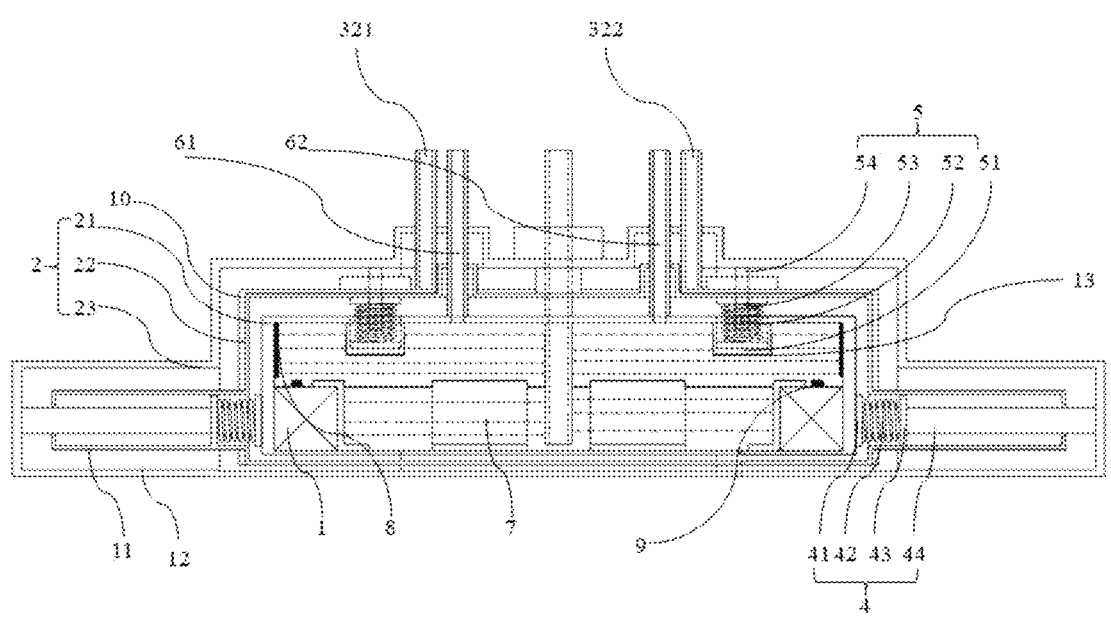
FIG. 3 is a longitudinal sectional view of the superconducting magnet for the eddy-current braking for the high-speed train according to the present application.

In the drawings: 1, superconducting coil; 2, container for the superconducting magnet; 21, coil box; 22, thermal shield; 23, Dewar; 311, liquid helium inlet; 312, liquid helium outlet; 321, liquid nitrogen inlet; 322, liquid nitrogen outlet; 4, horizontal tie rod assembly; 41, inner horizontal heat insulating block; 42, horizontal spring; 43, outer horizontal heat insulating block; 44, horizontal force transmission rod; 5, vertical tie rod assembly; 51, inner vertical heat insulating block; 52, vertical spring; 53, outer vertical heat insulating block; 54, vertical force transmission rod; 61, coil terminal inlet; 62, coil terminal outlet; 7, limit block; 8, liquid-level meter; 9, temperature sensor; 10, liquid nitrogen pipeline; 11, inner tube; 12, outer tube; and 13, recess.

DETAILED DESCRIPTION OF EMBODIMENTS

Embodiment 1

As shown in FIG. 1, this embodiment provides a superconducting magnet for eddy-current braking for a high-speed train. The superconducting magnet includes a superconducting coil 1, a container 2 for containing the superconducting magnet, a liquid helium inlet 311, a liquid helium outlet 312, a liquid nitrogen inlet 321, a liquid nitrogen outlet 322, a horizontal tie rod assembly 4, a vertical tie rod assembly 5, a coil terminal inlet 61, a coil terminal outlet 62, a limit block 7, a liquid-level meter 8 and a temperature sensor 9.

The superconducting magnet is fixed at a bottom of a bogie of a high-speed train through an external connection mechanism via a Dewar 23, and an air gap is formed between the superconducting magnet and a top surface of a guide rail below the bogie. The superconducting magnet after being excited generates an eddy-current effect with the guide rail of the high-speed train, so as to generate a braking force opposite to a traveling direction of the train, thereby braking the high-speed train. The superconducting magnet can withstand the vibration impact generated when the high-speed train is under operation through the horizontal and vertical tie rod assemblies.

In this embodiment, the superconducting magnet is an immersion-cooled superconducting magnet. The container includes a coil box 21, a thermal shield 22 and the Dewar 23 which are sequentially arranged from inside to outside. The coil box 21 is filled with liquid helium, and the superconducting coil 1 is directly immersed in the liquid helium such that the superconducting coil 1 have the same temperature with liquid helium under braking and non-braking.

In this embodiment, the superconducting magnet is further provided with a low-temperature cooling system to manage the cooling agent loss caused by alternating current loss during the braking as well as the heat radiation and heat conduction during the non-braking. The coil box 21 is provided with the liquid helium inlet 311 and the liquid helium outlet 312 configured to connect a liquid helium replenishing component of an external cooling system. The thermal shield 22 is provided with the liquid nitrogen inlet 321 and the liquid nitrogen outlet 322 configured to connect a liquid nitrogen replenishing component of the external cooling system.

In this embodiment, a NbTi superconducting wire is wound and insulated by vacuum pressure immersion to form the superconducting coil 1. The coil box 21 is made of non-magnetic materials such as stainless steel and aluminum. The thermal shield 22 is made of copper and the Dewar 23 is made of a non-magnetic material such as stainless steel or aluminum.

In this embodiment, the thermal shield 22 has a high vacuum environment therein, and a plurality of liquid nitrogen pipelines 10 are provided on an outer wall of the thermal shield 22 to realize the thermal insulation between the external environment and the superconducting magnet.

In this embodiment, the horizontal tie rod assembly 4 and the vertical tie rod assembly 5 are provided in the application, where the horizontal tie rod assembly 4 is configured to relieve a horizontal inertial impact force, i.e., an inertial impact force in the travelling direction of the train, on the superconducting magnet when the train is under braking; and the vertical tie rod assembly 5 is configured to relieve a vertical inertial impact force on the superconducting magnet when the train is under braking.

In this embodiment, the horizontal tie rod assembly 4 mainly includes an inner horizontal heat insulating block 41, a horizontal spring 42, an outer horizontal heat insulating block 43, a horizontal force transmission rod 44. The inner horizontal heat insulating block 41 is fixed at each of two side walls of the coil box 21. The horizontal force transmission rod 44 is fixedly sheathed in an inner tube 11. An outer end of the horizontal force transmission rod 44 extends out of the inner tube 11 and is fixed at an end of the outer tube 12; and an inner end of the horizontal force transmission rod 44 is fixedly connected to the outer horizontal heat insulating block 43. The horizontal spring 42 is provided between the inner horizontal heat insulating block and the outer horizontal heat insulating block. The vertical tie rod assembly 5 mainly includes an inner vertical heat insulating block 51, a vertical spring 52, an outer vertical heat insulating block 53 and a vertical force transmission rod 54. A recess 13 is provided at a top of the coil box 21. The inner vertical heat insulating block 43 is fixed at a bottom of the recess 13. The horizontal and vertical tie rod assemblies are made of a metal, a glass fiber or a carbon-fiber composite. The horizontal spring 42 is configured to reduce the impact on the coil box 21, the thermal shield 22 and the Dewar 23 of the container 2 when the train is under braking. The inner and outer horizontal heat insulating blocks and the inner and outer vertical heat insulating blocks are configured to reduce the heat leaked from the coil box 21 due to the presence of the horizontal and vertical tie rod assemblies.

In this embodiment, the coil box 21 and the thermal shield 22 are fixed on the Dewar 23 through the horizontal tie rod assembly 4 and the vertical tie rod assembly 5, where the Dewar 23 and the thermal shield 22 are fixedly connected to the horizontal force transmission rod 44 and the vertical force transmission rod 55 by welding or in other mechanical connection. The coil box 21 is fixed to the inner horizontal heat insulating block 41 and the inner vertical heat insulating block 51 through mechanical connection or adhesive bonding.

In this embodiment, the superconducting coil 1 is fixed inside the coil box 21 through the limit block 7.

In this embodiment, when the superconducting magnet is energized through an excitation power supply, a required magnetic field strength can be obtained within 1 s, so that a long excitation process is eliminated.

In this embodiment, the liquid-level meter 8 and the temperature sensor 9 are provided in the coil box 21 to monitor the operating temperature of the superconducting magnet. The liquid-level meter 8 and the temperature sensor 9 are observed during the operation of the superconducting magnet to prevent the quenching of the superconducting magnet due to high working temperature of the superconducting magnet and low liquid level of the cooling agent.

Embodiment 2

This embodiment is similar to Embodiment 1 except that the superconducting coil of the embodiment is made of a high-temperature superconducting wire, block or strip.

The above embodiments are merely intended to illustrate the invention, but are not intended to limit the scope of the invention. Any modifications without departing from the concept of the application shall fall within the scope of the present application.

What is claimed is:

1. A superconducting magnet for eddy-current braking for a high-speed train, comprising a container for the superconducting magnet;
wherein the container comprises a coil box, a thermal shield and a Dewar which are nested in sequence from inside to outside; the coil box is filled with liquid helium, and a liquid helium inlet and a liquid helium outlet are provided on the coil box; a superconducting coil is provided in the coil box and is immersed in the liquid helium; a coil terminal inlet and a coil terminal outlet are provided on the coil box; the thermal shield has a high vacuum environment therein; a plurality of liquid nitrogen pipelines surround an outer wall of the thermal shield; and the thermal shield is provided with a liquid nitrogen inlet and a liquid nitrogen outlet.

2. The superconducting magnet of claim 1, wherein each of two sides of the container is provided with an inner tube which is integrally formed with the thermal shield and an outer tube which is integrally formed with the Dewar; the outer tube is sheathed on the inner tube; each of the two sides of the container is provided with a horizontal tie rod assembly; the horizontal tie rod assembly comprises an inner horizontal heat insulating block, a horizontal spring, an outer horizontal heat insulating block and a horizontal force transmission rod; the inner horizontal heat insulating block is fixed on each of two side walls of the coil box; the horizontal force transmission rod is fixedly sheathed in the inner tube; an outer end of the horizontal force transmission rod extends out of the inner tube and is fixed at an end of the outer tube; an inner end of the horizontal force transmission rod is fixedly connected to the outer horizontal heat insulating block; and the horizontal spring is provided between the inner horizontal heat insulating block and the outer horizontal heat insulating block.

3. The superconducting magnet of claim 1, wherein a vertical tie rod assembly is provided at an upper portion of the container; the vertical tie rod assembly comprises an inner vertical heat insulating block, a vertical spring, an outer vertical heat insulating block and a vertical force transmission rod; a recess is provided at a top of the coil box; the inner vertical heat insulating block is fixed at a bottom of the recess; the vertical force transmission rod is longitudinally fixedly inserted in a top of the thermal shield; a top end of the vertical force transmission rod is fixed on the Dewar, and a bottom end of the vertical force transmission rod is fixedly connected to the outer vertical heat insulating block; and the vertical spring is provided between the inner vertical heat insulating block and the outer vertical heat insulating block.

4. The superconducting magnet of claim 2, wherein a vertical tie rod assembly is provided at an upper portion of the container; the vertical tie rod assembly comprises an inner vertical heat insulating block, a vertical spring, an outer vertical heat insulating block and a vertical force transmission rod; a recess is provided at a top of the coil box; the inner vertical heat insulating block is fixed at a bottom of the recess; the vertical force transmission rod is longitudinally fixedly inserted in a top of the thermal shield; a top end of the vertical force transmission rod is fixed on the Dewar, and a bottom end of the vertical force transmission rod is fixedly connected to the outer vertical heat insulating block; and the vertical spring is provided between the inner vertical heat insulating block and the outer vertical heat insulating block.

5. The superconducting magnet of claim 1, wherein the superconducting coil is fixed inside the coil box through a limit block.

6. The superconducting magnet of claim 1, wherein a liquid-level meter and a temperature sensor are provided in the coil box.

7. The superconducting magnet of claim 1, wherein the container is fixed to a bottom of a bogie of the high-speed train through a support structure, and an air gap is formed between the container and a top surface of a guide rail below the bogie.

8. The superconducting magnet of claim 1, wherein a liquid level of the liquid helium is at least 1.5 times the height of the superconducting coil.

9. The superconducting magnet of claim 1, wherein the superconducting coil is oval-shaped.

10. The superconducting magnet of claim 3, wherein four vertical tie rod assemblies are arranged at the upper portion of the container.

11. The superconducting magnet of claim 4, wherein four vertical tie rod assemblies are arranged at the upper portion of the container.

* * * * *